A. D. WEBSTER.
ROOT CUTTING PLOW.
APPLICATION FILED DEC. 15, 1914.

1,149,102.

Patented Aug. 3, 1915.
2 SHEETS—SHEET 1.

Witnesses
Gerald Kenney
J. W. Garner

Inventor
Alvah D. Webster,
By Victor J. Evans,
Attorney

A. D. WEBSTER.
ROOT CUTTING PLOW.
APPLICATION FILED DEC. 15, 1914.

1,149,102.

Patented Aug. 3, 1915.
2 SHEETS—SHEET 2.

Witnesses
Gerald Hennessy
J. W. Garner

Inventor
Alvah D. Webster,
By Victor J. Evans
Attorney

UNITED STATES PATENT OFFICE.

ALVAH D. WEBSTER, OF HAVERHILL, MASSACHUSETTS.

ROOT-CUTTING PLOW.

1,149,102.   Specification of Letters Patent.   Patented Aug. 3, 1915.

Application filed December 15, 1914. Serial No. 877,387.

*To all whom it may concern:*

Be it known that I, ALVAH D. WEBSTER, a citizen of the United States, residing at Haverhill, in the county of Essex and State of Massachusetts, have invented new and useful Improvements in Root-Cutting Plows, of which the following is a specification.

This invention is an improved root cutting plow for cutting the roots of trees, brush and the like when clearing land, and also especially adapted for cutting palmetto roots, the object of the invention being to provide an improved plow which while especially adapted for cutting roots and clearing soil for cultivation is also adapted for turning furrows.

The invention consists in the construction, combination and arrangement of devices hereinafter described and claimed.

Figure 1:
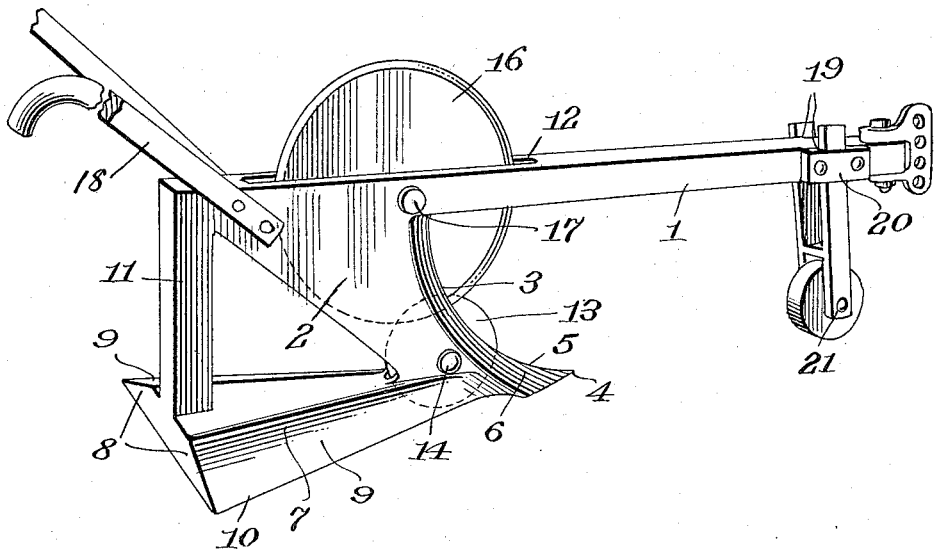
Figure 2:
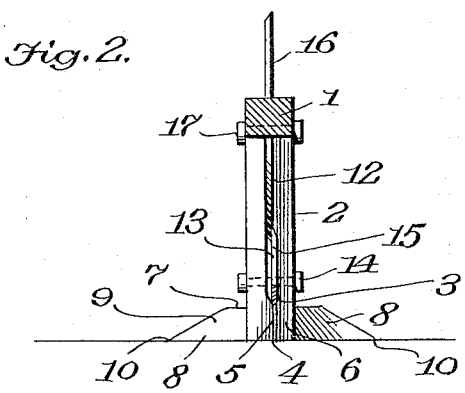
Figure 3:
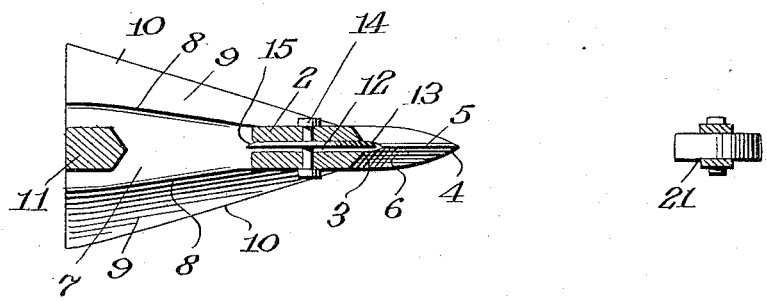
Figure 4:
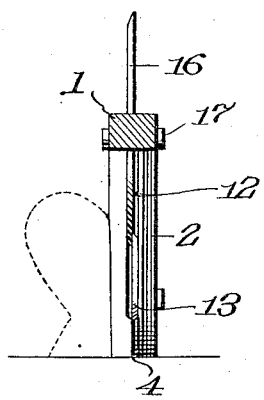

In the accompanying drawings:—Figure 1 is a perspective view of a root cutting plow constructed in accordance with my invention. Fig. 2 is a front elevation of the same, with the beam shown in section. Fig. 3 is a horizontal sectional view of the same. Fig. 4 is a front elevation of a modified form of my invention and also showing a mold board in dotted lines, adapting the plow to be used also as a turning plow.

The beam is indicated at 1. The standard is formed by a vertical plate 2 which is flat on opposite sides and is also beveled on opposite sides to form a front cutting edge 3. At the lower front corner of the standard plate is a point 4 which also has a cutting edge 5, formed by bevels 6, corresponding with the bevels of the front side of the standard plate. The standard plate is here shown as widening upwardly so that its rear portion extends nearly to the rear end of the beam. A shoe 7 extends rearwardly from the lower end of the standard plate, the front end of the shoe being just in rear of the point 4 and the said point extending downwardly below the front end of the shoe. The shoe, in the form of the plow shown in Figs. 1–2 and 3 is substantially triangular in plan and provided with laterally and rearwardly widening extensions 8 on opposite sides of the plow which are beveled downwardly and outwardly each as at 9 to form lower cutting edges 10 which are adapted to cut the downwardly extending roots of palmettoes or brush. The rear end of the shoe is connected to the rear end of the beam by a standard 11 which also serves to brace and strengthen both the shoe and the beam.

The standard plate and the beam are provided with a vertical central longitudinally extending slot 12 which extends from the top of the beam to the bottom of the front portion of the shoe. A lower central cutter disk 13 is arranged in the lower portion of this slot and has an axle 14 which extends through openings in opposite sides of the standard plate, said openings forming bearings for the said axle. If preferred ball bearings may be provided. This lower disk is beveled on one side as at 15 to form a cutting edge. The front portion of the disk projects forwardly above the point and in the angle between the latter and the front edge of the standard plate. The lower portion of said disk projects downwardly below the front portion of the shoe. An upper disk 16, which is considerably larger than the lower disk is also mounted in the slot, on an axle 17, which has its bearings in the sides of the standard plate. The lower portion of the upper disk overlaps the upper portion of the lower disk, said disks are in mutual contact and the upper disk is beveled on the side opposite the beveled lower disk to form a cutting edge as will be understood. Handles 18 are secured to opposite sides of the beam near the rear end of the latter and at the front end of the beam is a bifurcated standard 19, adjustably secured in clips 20 and provided at the lower end with a roller 21.

When the plow is in operation the point runs below the surface to a suitable depth and the shoe also runs below the surface but not at the same depth as the point. Such roots as are struck by the point are forced upwardly and caught between the revoluble cutting disks so that said cutting disks are caused to turn by the forward movement of the plow and to exert shear action on said roots and hence cut them and thus greatly help to clear the way for the plow. Such roots as are caught by the shoe are forced outwardly by the wedge action of the shoe and drawn against the cutting edges of the shoe and hence effectually severed thereby. Thus the plow destroys the roots of palmetto and of brush and the like and enables soil to be readily cleared for cultivation.

In the modified form of my invention shown in Fig. 4 the shoe is shown with only one lateral extension, arranged on one side of the plow, and a mold board, indicated in dotted lines, is also arranged on one side of the plow thereby adapting the plow for use as a turning plow, for turning furrows.

Having thus described my invention, I claim:—

1. A root cutting plow comprising a vertical standard plate having a flat outer side and provided with a narrowed front edge, a point extending downwardly and forwardly from the standard plate, a wedge shaped shoe extending rearwardly and also laterally from the said standard plate, at the lower end of the latter, and having a beveled outer cutting edge and a pair of revolubly mounted cutting disks arranged in partially overlapping relation and with their front edges extending forwardly of the standard plate.

2. A root cutting plow comprising a vertical standard plate having a flat outer side and provided with a narrowed front edge, a point extending downwardly and forwardly from the standard plate, a wedge shaped shoe extending rearwardly and also laterally from the said standard plate, at the lower end of the latter, and having a beveled outer cutting edge and a pair of revolubly mounted cutting disks arranged in partially overlapping relation and with their front edges extending forwardly of the standard plate, said standard plate and the front portion of said shoe being provided with a slot spaced from the sides thereof and in which said disks are mounted.

In testimony whereof I affix my signature in presence of two witnesses.

ALVAH D. WEBSTER.

Witnesses:
WILLIAM C. MCCORISAN,
LIZZIE D. ROWELL.

Copies of this patent may be obtained for five cents each, by addressing the "Commissioner of Patents, Washington, D. C."